United States Patent
Satou et al.

(10) Patent No.: US 6,808,768 B2
(45) Date of Patent: Oct. 26, 2004

(54) POROUS, FINE INORGANIC PARTICLES

(75) Inventors: Seiji Satou, Fuji (JP); Yasuhide Isobe, Fuji (JP); Kenzou Onizuka, Fuji (JP)

(73) Assignee: Asani Kasei Kabushiki Kaisha (JP)

( * ) Notice: Subject to any disclaimer, the term of this patent is extended or adjusted under 35 U.S.C. 154(b) by 0 days.

(21) Appl. No.: 10/312,820

(22) PCT Filed: Jun. 26, 2001

(86) PCT No.: PCT/JP01/05465
§ 371 (c)(1),
(2), (4) Date: Dec. 26, 2002

(87) PCT Pub. No.: WO02/00550
PCT Pub. Date: Jan. 3, 2002

(65) Prior Publication Data
US 2003/0143345 A1 Jul. 31, 2003

(30) Foreign Application Priority Data
Jun. 26, 2000 (JP) .......................... 2000-190805
Apr. 25, 2001 (JP) .......................... 2001-127699

(51) Int. Cl.⁷ .............................. B32B 3/26; B32B 5/16; B41M 5/124
(52) U.S. Cl. ................ 428/32.25; 428/32.32; 428/32.37; 428/304.4; 428/329; 428/331; 428/402
(58) Field of Search .................. 428/32.25, 32.32, 428/32.34, 32.37, 304.4, 329, 331, 402

(56) References Cited

U.S. PATENT DOCUMENTS

| | | | |
|---|---|---|---|
| 5,268,101 A | * 12/1993 | Anderson et al. | 210/510.1 |
| 5,935,700 A | * 8/1999 | Enomoto et al. | 428/330 |
| 6,025,068 A | * 2/2000 | Pekala | 428/315.5 |
| 6,096,469 A | 8/2000 | Anderson et al. | |
| 6,177,188 B1 | * 1/2001 | Ichioka et al. | 428/32.2 |
| 6,569,908 B2 | * 5/2003 | Noguchi et al. | 516/83 |
| 6,630,212 B2 | * 10/2003 | Bermel et al. | 428/32.15 |
| 6,632,489 B1 | * 10/2003 | Watanabe et al. | 428/32.34 |
| 6,689,430 B2 | * 2/2004 | Sadasivan et al. | 428/32.34 |

FOREIGN PATENT DOCUMENTS

| | | |
|---|---|---|
| EP | 335195 | 10/1989 |
| JP | 1-230421 A | 9/1989 |
| JP | 5-294612 A | 11/1993 |
| JP | 2000-281331 | 10/2000 |

* cited by examiner

Primary Examiner—H. Thi Le
(74) Attorney, Agent, or Firm—Dickstein, Shapiro, Morin & Oshinsky, LLP.

(57) ABSTRACT

The present invention provides an amorphous porous inorganic substance having small particle sizes and uniform pores, a process for synthesizing the same, and use of the same. The invention provides an amorphous porous inorganic substance having pores of a uniform pore diameter, which has an average particle size $D_L$ of 10 to 400 nm as measured by a dynamic light scattering method and a specific surface area difference, $S_B - S_L$, between a conversion specific surface area $S_L$ calculated from $D_L$ and a nitrogen adsorption specific surface area $S_B$ obtained by the BET method, of 250 m²/g or more. A process for synthesizing the same and use of the same are also disclosed.

7 Claims, 4 Drawing Sheets

POROUS, FINE INORGANIC PARTICLES

TECHNICAL FIELD

This invention relates to a finely particulate amorphous porous inorganic substance and its sol; a process for synthesizing the same; use of the same; inkjet recording media containing the same, which are used for inkjet printing or recording, such as papers, sheets, films, and fabrics; and a coating liquid used to produce the inkjet recording media.

BACKGROUND ART

Technologies using fine inorganic particles attract attention not only from expectation for improved functions of electronic materials but also from the standpoint of energy saving and environmental conservation.

Known fine inorganic particles, which are mostly produced by a vapor phase method or a liquid phase method, include oxides, such as Aerosil and colloidal silica, and metal particles, such as colloidal gold. Most of them are solid particles with no pores inside. On the other hand, known amorphous porous inorganic substances include gels with pores between grains, such as silica gel and alumina gel, and amorphous activated carbon, which are generally large particles.

Known amorphous porous inorganic fine particles include fine spherical porous silica particles disclosed, e.g., in JP-B-4-70255, but such a technique merely provides those having irregularly-shaped and small-diameter pores. Porous inorganic fine particles synthesized by using a template include those disclosed in Chem. Lett., (2000), 1044, Stu. Sur. Sci. Catal., 129 (2000), 37, and JP-A-11-100208, but all of them are crystalline. Substances with a regular structure exhibiting crystallinity are not always favorable for use as an adsorbent or a catalyst carrier on account of their shape selectivity. Further, there was obtained a precipitate in each case, and a sol having fine particles dispersed therein has not yet obtained. Examples of an amorphous porous inorganic substance obtained using a template include those disclosed in JP-A-2000-109312. However, the synthesis disclosed therein is carried out by a precipitation method using a combination of a metal silicate and an inorganic acid, and hence the product has a large particle size and is not obtained in the form of sol.

Inkjet recording has been extending its use in wide fields because of low noise, color recording capabilities, and high-speed recording capabilities. Since wood-free paper, etc. that are used in general printing are inferior in ink absorptivity, ink drying properties and image quality such as resolution, improved dedicated papers have been proposed to solve these inferiorities. Recording papers coated with various inorganic pigments including amorphous silica to have improved ink color developability or reproducibility have been disclosed (see, e.g., JP-A-55-51583 and JP-A-56-148585). However, along with recent progress of the performances of inkjet printers, further improvements have been demanded also on recording media and a satisfactory performance is not necessarily obtained merely with the above-described technique. In particular, obtaining high image quality equal to silver halide photographs involves increases of the ink ejection amount per unit area of a recording medium, which gives rise to insufficient ink absorptivity and blurring problems. Further, transparency of an ink absorbing layer has also been demanded for realizing high image quality and color density comparable to silver halide photographs.

The present invention is to provide an amorphous porous inorganic substance having a small particle diameter and a uniform pore shape, a sol thereof, and a synthesis process therefor.

Also, the present invention is to provide use of the substance, particularly an inkjet recording medium excellent in ink absorptivity and transparency, and a coating liquid for inkjet recording media.

DISCLOSURE OF THE INVENTION

The present invention provides the followings:

(1) A porous substance comprising inorganic particles which are amorphous and have pores of a uniform diameter, wherein said particles have an average particle size $D_L$ of 10 to 400 nm as measured by a dynamic light scattering method, and wherein said porous substance has a specific surface area difference, $S_B-S_L$, between a conversion specific surface area $S_L$ calculated from $D_L$ and a nitrogen adsorption specific surface area of the particles $S_B$ obtained by the BET method, of 250 m$^2$/g or more.

(2) The porous substance set forth in item (1), wherein the pores have an average diameter of 6 nm or larger.

(3) The porous substance set forth in item (1) or (2), wherein the inorganic material is silicon oxide.

(4) The porous substance set forth in item (1) or (2), wherein the inorganic material contains silicon and aluminum.

(5) A sol comprising a solvent and 0.5 to 30% by weight of the porous substance set forth in any one of items (1) to (4) contained in the solvent.

(6) A porous substance sol comprising inorganic particles which are amorphous and have uniform pores and which are produced by a process comprising the steps of:

mixing a metal source comprising a metal oxide and/or a precursor thereof, a template, and water to prepare a metal oxide/template composite sol; and removing the template from the composite.

(7) The porous substance sol set forth in item (6), wherein the process further comprises the step of adding an alkali aluminate.

(8) The porous substance sol set forth in item (6) or (7), wherein the template is a nonionic surface active agent represented by structural formula (1):

$$HO(C_2H_4O)_a\text{—}(C_3H_6O)_b\text{—}(C_2H_4O)_cH \quad (1)$$

wherein a and c each represent 10 to 110; and b represents 30 to 70, and wherein the metal source, template and water are mixed at a water to template (water/template) weight ratio ranging from 10 to 1000.

(9) The porous substance sol set forth in any one of items (6) to (8), wherein the metal source and the template are mixed at a pH ranging from 3 to 12.

(10) The porous substance sol set forth in any one of items (6) to (9), wherein the metal source is active silica.

(11) The porous substance sol set forth in item (10), wherein the metal source, template and water are mixed at a weight ratio of the template to the active silica as the metal source in terms of SiO$_2$ (template/SiO$_2$) ranging from 0.01 to 30.

(12) A porous substance obtained from the porous substance sol set forth in any one of items (6) to (11).

(13) An inkjet recording medium comprising a support and one or more ink absorbing layers provided on the support, wherein at least one of the ink absorbing layer(s) contains the porous substance set forth in any one of items (1) to (4) and (12).

(14) A coating liquid for an inkjet recording medium containing the porous substance and/or the porous substance sol set forth in any one of items (1) to (12).

BEST MODE FOR CARRYING OUT THE INVENTION

The present invention will be described in detail.

The present invention provides a porous amorphous inorganic substance with uniform pores which has an average particle size, $D_L$, of 10 to 400 nm as measured by a dynamic light scattering method and a specific surface area difference, $S_B-S_L$, between a conversion specific surface area $S_L$ calculated from $D_L$ and a nitrogen gas adsorption specific surface area of the particles $S_B$ obtained by the BET method, of 250 m$^2$/g or more.

The term "amorphous" as used herein means that the porous substance shows no regularity over a long range (i.e., no long-period order) in its atomic structure or pore structure nor a distinct peak in powder X-ray diffractometry. For example, an amorphous substance shows a regularity only in as short a range as few nanometers referring to its atomic arrangement, or only in as short a range as 10 pores at the most referring to its pore arrangement.

The term "porous" as used herein means having pores that are measurable by the nitrogen adsorption method and preferably having a pore volume of 0.1 ml/g or larger, more preferably 0.5 ml/g or larger. The average pore size of the porous substance is preferably, but not limited to, 6 nm or greater, more preferably 6 to 30 nm. While dependent on use, larger pore sizes are preferred for allowing a larger substance to enter the pores with ease and to diffuse more rapidly. Small pore sizes are not favorable because water vapor, etc. in air can clog the pores to hinder a substance from flowing into the pores. The phrase "having a uniform pore size" means that 50% or more of the pores based on the total pore volume (total volume of pores having diameters of 50 nm or smaller which are measurable by the nitrogen adsorption method) falls within a pore diameter range of ±50% of the average pore size in the relationship between the pore size and the total pore volume determined from the nitrogen adsorption isothermal curve. Whether or not the pores are uniform can also be confirmed through TEM observation.

The average particle size of the porous substance according to the present invention as measured by a dynamic light scattering method is preferably 10 to 400 nm, more preferably 10 to 300 nm, particularly preferably 10 to 200 nm. If the porous substance has a particle size of 200 nm or smaller when dispersed in a solvent or a binder, further higher transparency can be obtained. Particularly, when used as an ink absorbing layer of an inkjet recording medium, printed matter with good color development and high color density can be obtained owing to the high transparency. Particles greater than 200 nm result in reduced transparency, and particles greater than 400 nm easily settle out in high concentration sols, which are unfavorable for some uses.

Assuming that the porous substance particles are spherical, the conversion specific surface area $S_L$ (m$^2$/g) is calculated from the average particle size $D_L$ (mn) measured by a dynamic light scattering method according to equation: $S_L = 6 \times 10^3/(\text{density (g/cm}^3) \times D_L)$. Having a difference between this value and a nitrogen adsorption specific surface area $S_B$ obtained by the BET method, i.e., $S_B-S_L$, of 250 m$^2$/g or more means that the particles of the porous substance are extremely porous. A porous substance having a small $S_B-S_L$ difference exhibits reduced capability to absorb a substance, for example, reduced ink absorptivity when used as an ink absorbing layer. The $S_B-S_L$ value is preferably 1500 m$^2$/g or smaller. When the value is high, it may result in deteriorated handling properties.

The term "sol" as used herein denotes a colloid solution comprising a liquid as a dispersion medium and the porous substance of the invention as a dispersoid. Any dispersion medium can be used so long as it does not cause sedimentation. Preferably, water, an alcohol, or a mixed solvent of water and an alcohol is used. Suitable alcohols include lower alcohols, such as ethanol and methanol. The dispersion medium may contain an alkali such as NaOH, a low-molecular polyvinyl alcohol (hereinafter referred to as low-molecular PVA) and a surface active agent as stabilizers for preventing particles from agglomeration. The sol concentration is preferably 0.5 to 30% by weight, more preferably 5 to 30% by weight, though it varies depending on the use. Sols having too low concentrations are disadvantageous not only from the standpoint of economy and transportation but also in that they hardly dry when used for coating. Too high concentrations result in high viscosity, which possibly leads to a deteriorated stability unfavorably.

The metal source which can be used in the invention is a metal oxide and/or a precursor thereof. Species of the metal include silicon; alkaline earth metals in the Group 2 elements such as magnesium and calcium; aluminum, gallium and rare earth elements in the Group 3 elements; titanium and zirconium in the Group 4 elements; phosphorus and vanadium in the Group 5 elements; manganese and tellurium in the Group 7 elements; and iron and cobalt in the Group 8 elements. The precursor includes inorganic salts, such as nitrates and hydrochlorides, organic acid salts, such as acetates and naphthenates, organometallic salts (e.g., alkylaluminum), alkoxides and hydroxides of these metals. The precursor is not limited to these examples, and any metal oxide precursor that can be synthesized by the synthesis methods described below can be employed. These metal oxides and their precursors can be used either individually or as a combination of two or more thereof.

In the case of using silicon as a metal species, the precursor includes one capable of finally becoming silica through repetition of condensation or polymerization. Preferably alkoxides, such as tetraethoxysilane, methyltriethoxysilane, dimethyltriethoxysilane and 1,2-bis(triethoxysilyl)ethane, and active silica are used alone or in combination of two or more thereof. Active silica is especially preferred for its inexpensiveness and high safety. Active silica for use in the invention can be prepared by, for example, extraction from water glass with an organic solvent or ion-exchange of water glass. Where it is prepared by bringing water glass into contact with an H$^+$ cation exchanger, it is preferred for industrial production to use No. 3 water glass because of its low Na content and low price. Preferred examples of the cation exchanger include, but are not limited to, sulfonated polystyrene divinylbenzene-based strongly acidic ion exchange resins (e.g., Amberlite IR-120B from Rohm & Haas).

The template for use in the present invention is not limited and includes cationic (such as quaternary ammonium type surfactants), anionic, nonionic or amphoteric surface active agents, and neutral templates such as amines, e.g., dodecylamine, tetradecylamine, hexadecylamine and octadecylamine, and amine oxides. It is preferred to use nonionic surface active agents, such as triblock agents (e.g., Adeka Pluronic L•P•F•R series from Asahi Denka Kogyo K. K.), polyethylene glycols (e.g., Adeka PEG series from Asahi Denka), and ethylenediamine-based agents (e.g., Adeka Pluronic TR series).

The nonionic surface active agents include triblock agents comprising ethylene oxide and propylene oxide, especially those represented by structural formula: $HO(C_2H_4O)_a$—$(C_3H_6O)_b$—$(C_2H_4O)_cH$, wherein a and c each represent 10 to 110; and b represents 30 to 70, and compounds represented by structural formula: $R(OCH_2CH_2)_nOH$, wherein R represents an alkyl group having 12 to 20 carbon atoms; and n represents 2 to 30. Examples thereof are Pluronic P103 $(HO(C_2H_4O)_{17}$—$(C_3H_6O)_{60}$—$(C_2H_4O)_{17}H)$, P123 (HO $(C_2H_4O)_{20}$—$(C_3H_6O)_{70}$—$(C_2H_4O)_{20}H)$ and P85, each available from Asahi Denka, polyoxyethylene lauryl ether, polyoxyethylene cetyl ether, and polyoxyethylene stearyl ether.

In order to vary the pore size, an organic assistant, such as an aromatic hydrocarbon having 6 to 20 carbon atoms, an alicyclic hydrocarbon having 5 to 20 carbon atoms, an aliphatic hydrocarbon having 3 to 16 carbon atoms, and amine or halogen derivatives thereof, such as toluene, trimethylbenzene, and triisopropylbenzene, may be added.

The process according to the present invention is described below.

The reaction between the metal source and the template can be carried out, for example, after mixing and stirring a solution or dispersion of the metal source in a solvent and a solution or dispersion of the template in a solvent, but is not limited thereto. The solvents include water and a mixed solvent of water and an organic solvent. Alcohols are preferred as the organic solvents. Preferred alcohols include lower alcohols, such as ethanol and methanol.

The composition of the reaction system, which varies depending on the template, metal source and solvent, should be selected from such ranges that do not cause particles to agglomerate or settle out and to enlarge the particle size. In order to prevent the particles' agglomeration or sedimentation, a stabilizer, such as an alkali (e.g., NaOH) and a low-molecular PVA, may be added.

In the case of using active silica as a metal source, Pluronic P103 (from Asahi Denka) as a template, and water as a solvent, for example, the following composition can be used. A preferred $P103/SiO_2$ weight ratio ranges 0.01 to 30, more preferably 0.1 to 5. A preferred organic assistant/P103 weight ratio is 0.02 to 100, more preferably 0.05 to 35. The water/P103 weight ratio during the reaction is preferably 10 to 1000, more preferably 20 to 500. NaOH may be added as a stabilizer at an $NaOH/SiO_2$ weight ratio of $1\times10^{-4}$ to 0.15. In the case of using Pluronic P123, similar compositions can be used.

Mixing of the metal source, template and solvent is effected while stirring preferably at 0 to 80° C., more preferably at 0 to 40° C.

The reaction proceeds easily at ambient temperature or, if necessary, under heating up to 100° C. Hydrothermal reaction conditions at temperatures as high as exceeding 100° C. are not necessary. The reaction time ranges from 0.5 to 100 hours, preferably 3 to 50 hours. The pH during the reaction is preferably 3 to 12, more preferably 4 to 12, particularly preferably 4 to 10. An alkali, e.g., NaOH or ammonia, or an acid, e.g., hydrochloric acid, acetic acid or sulfuric acid, may be added for pH adjustment.

In producing a porous substance sol, an alkali aluminate can be added either before or after the formation of the composite or after removal of the template.

Where the composite contains silicon, addition of an alkali aluminate results in production of a sol which is stable enough to withstand long-term storage even when rendered acidic or having a cationic substance added.

The alkali aluminate which can be used includes sodium aluminate, potassium aluminate, lithium aluminate, ammonium primary aluminate, and guanidine aluminate, with sodium aluminate being preferred. The Na/Al elemental ratio in sodium aluminate is preferably 1.0 to 3.0.

The following description is made as an example referring to the case where an alkali aluminate solution is added after the removal of a template. An alkali aluminate solution is added while stirring at 0 to 80° C., preferably 5 to 40° C. The concentration of the alkali aluminate to be added is preferably, but not limited to, 0.5 to 40% by weight, more preferably 1 to 20% by weight. The amount to be added, in terms of Al/(Si+Al) elemental ratio where a porous substance sol contains silicon, is preferably 0.003 to 0.1, more preferably 0.005 to 0.05. After the addition, the reaction mixture is preferably heated at 40 to 95° C., more preferably 60 to 80° C.

Next, the method for removing the template is described. For example, a solvent, e.g., an alcohol, is added to the resulting reaction solution so as to remove the template from the composite, thus obtaining a porous substance. An ultrafiltration apparatus is used to advantage so that the porous substance can be handled as a sol. The membrane for ultrafiltration can be of polysulfone, polyacrylonitrile, cellulose, etc. and in any of hollow fiber, flat sheet, spiral wound, and other configurations. In order to prevent the particles from agglomerating, a stabilizer such as an alkali (e.g., NaOH) or a low-molecular PVA may be added. The solvent used for the template removal is not limited as long as it is capable of dissolving the template. Water that is easy to handle or alcohols having high dissolving power are preferred. The alcohols preferably include lower alcohols, such as methanol and ethanol. While varying depending on the solvent used and the template, the temperature for the removal is preferably 0 to 80° C., more preferably 20 to 80° C. The template thus removed can be reused after solvent removal. Alternatively, the porous substance may be obtained by collecting the resulting composite by filtration or a like operation, washing with water, and drying, followed by contacting the dried composite with a supercritical fluid or a solvent (e.g., an alcohol) or calcination to remove the template. The calcination is at or above the temperature at which the template disappears, usually 500° C. or higher. The calcination time, though decided appropriately in connection with the temperature, is about from 30 minutes to 6 hours. As further other methods, the template can be removed by mixing and stirring the composite with a solvent or passing a solvent through a column, etc. packed with the composite.

For removing the solvent from the sol to give a porous substance, methods of heat drying, vacuum drying, spray drying, or supercritical drying can be employed.

Various modifications can be added to the porous substance and/or the porous substance sol of the present invention depending on their intended use. For example, a surface modification with a silane coupling agent, etc. may be made, or a metal, such as platinum or palladium, may be supported thereon.

Having pores, the porous substance of the invention is expected to have such functions as absorbing a substance therein, embracing and protecting a substance, or slowly releasing a substance. It can be used as, for example, an adsorbent of an adsorption heat pump, a humidity modifier, a catalyst, a catalyst carrier, an ink absorber, a medical carrier used in a drug delivery system and the like, and a carrier for cosmetics, foods, and dyes. Being finely particulate, the porous substance of the invention is also applicable to those fields requiring transparency, smoothness, and the like. For instance, it can be used as a filler of rubbers, resins or paper, a thickener of coatings, a thixotropic agent, an anti-settling agent, and an antiblocking agent for films. Having transparency, pores and a low density, the porous substance of the invention can also be used as a low-refractive index film, an antireflection film, a low-dielectric film, a hard coat film, a heat insulator, a sound absorber, and so forth. In particular, taking advantages of the abilities to form a smooth transparent film and to absorb a substance, the porous substance can be suitably used in photograph-like inkjet recording media.

Application to inkjet recording media is hereinafter described. Inkjet inks to be used can contain either dyes or pigments as a colorant and be either aqueous or non-aqueous.

The inkjet recording medium according to the present invention comprises a support and at least one ink absorbing layer provided on the support. If desired, two or more ink absorbing layers are provided. The provision of multi-layered ink absorbing layers make it possible to distribute functions each layer, for example, imparting a gloss to the surface. At least one of the ink absorbing layers contains the porous substance of the invention.

The content of the porous substance of the invention is preferably, but not limited to, 10 to 99% by weight based on the ink absorbing layer in which the porous substance is incorporated, and 1 to 99% by weight based on the total weight of the ink absorbing layers. Low porous substance contents unfavorably result in reduced ink absorptivity.

The ink absorbing layer can contain an organic binder as a binder that does not spoil the ink absorbing properties of the porous substance. Useful organic binders include polyvinyl alcohol (PVA) and derivatives thereof, polyvinyl acetates, polyvinylpyrrolidones, polyacetals, polyurethanes, polyvinylbutyrals, poly(meth)acrylic acids (or esters), polyamides, polyacrylamides, polyester resins, urea resins, melamine resins; those originated in natural polymers, such as starch and starch derivatives, cellulose derivatives, e.g., carboxymethyl cellulose and hydroxyethyl cellulose, casein, and gelatin; latices, and emulsions. The latices include vinyl acetate polymer latices, styrene-isoprene copolymer latices, styrene-butadiene copolymer latices, methyl methacrylate-butadiene copolymer latices, acrylic ester copolymer latices, and functional group-modified polymer latices obtained by modifying these copolymers with a functional group-containing (e.g., a carboxyl-containing) monomer. The PVA derivatives include cation-modified polyvinyl alcohol and silanol-modified polyvinyl alcohol. These binders can be used in combination.

The organic binder content is not particularly limited. Polyvinyl alcohol, for example, is preferably used in an amount of 5 to 400 parts by weight, particularly preferably 5 to 100 parts by weight, per 100 parts by weight of the porous substance. Larger amounts lead to reduced film-forming properties, and smaller amounts lead to reduced ink absorptivity, each of which is thus unfavorable.

The present invention also provides a coating liquid for inkjet recording media which comprises components for forming an ink absorbing layer and a solvent. The solvent to be used preferably includes, but is not limited to, water-soluble solvents, such as alcohols, ketones, and esters, and/or water. If desired, the coating liquid can contain pigment dispersants, thickeners, flowability modifiers, defoaming agents, foam inhibitors, parting agents, foaming agents, colorants, and the like.

It is preferred that at least one ink absorbing layer contain a cationic polymer. The cationic polymer contained improve water resistance of a printed image. While any cationic polymer is usable as long as it is cationic, it is preferable to use one containing at least one of primary amine, secondary amine or tertiary amine substituents and their salts and quaternary ammonium salt substituents. Examples therefor include a dimethyldiallylammonium chloride polymer, a dimethyldiallylammonium chloride-acrylamide copolymer, an alkylamine polymer, a polyaminedicyan polymer, and polyallylamine hydrochloride. Preferred weight average molecular weights of the cationic polymers are, but not limited to, 1,000 to 200,000.

It is preferred for at least one ink absorbing layer to contain an ultraviolet absorber, a hindered amine light stabilizer, a single oxygen quencher or an antioxidant. These substances, if contained, improve light fastness of a printed image. Preferably used ultraviolet absorbers include, but are not limited to, benzotriazole compounds, benzophenone compounds, titanium oxide, cerium oxide, and zinc oxide. Preferably used hindered amine light stabilizers include, but are not limited to, those having a piperidine ring containing an N—R moiety (wherein R is a hydrogen atom, an alkyl group, a benzyl group, an allyl group, an acetyl group, an alkoxy group, a cyclohexyl group or a benzyloxy group). Preferably used single oxygen quenchers include, but are not limited to, aniline derivatives, organonickel compounds, spiro-chroman compounds, and spiro-indane compounds. Preferably used antioxidants include, but are not limited to, phenol compounds, hydroquinone compounds, organosulfur compounds, phosphorus compounds, and amine compounds.

It is preferred for at least one ink absorbing layer to contain an alkaline earth metal compound. The alkaline earth metal compound, if contained, improves light fastness. Preferably used alkaline earth metal compounds include oxides, halides, and hydroxides of magnesium, calcium or barium. The method for incorporating the alkaline earth metal compound into the ink absorbing layer is not particularly restricted. It can be added to a coating slurry or added or adhered to the inorganic porous substance during or after the synthesis. The amount of the alkaline earth metal compound is preferably 0.5 to 20 parts by weight in terms of an oxide per 100 parts by weight of the inorganic porous substance.

It is preferred for at least one ink absorbing layer to contain a nonionic surface active agent. The nonionic surface active agent, if contained, improves image quality and light fastness. Preferably used nonionic surface active agents include, but are not limited to, higher alcohols, ethylene oxide adducts of carboxylic acids, and ethylene oxide-propylene oxide copolymers, with ethylene oxide-propylene oxide copolymers being more preferred. The method of incorporating the nonionic surface active agent into the ink absorbing layer is not particularly restricted. It can be added to a coating slurry or added or adhered to the inorganic porous substance during or after the synthesis.

It is preferred for at least one ink absorbing layer to contain an alcohol compound. The alcohol compound, if contained, improves image quality and light fastness. Preferably used alcohol compounds include, but are not limited to, aliphatic alcohols, aromatic alcohols, polyhydric alcohols, and hydroxyl-containing oligomers, with polyhydric alcohols being more preferred. The method of incorporating the alcohol compound into the ink absorbing layer is not particularly restricted. It can be added to a coating liquid slurry or added or adhered to the porous inorganic substance during or after the synthesis.

It is preferred for at least one ink absorbing layer to contain alumina hydrate. The alumina hydrate, if contained, improves image quality and water resistance. The structure of alumina hydrate to be used includes, but is not limited to, a boehmite structure, a psuedoboehmite structure, and an amorphous structure. Alumina hydrate of pseudoboehimite structure is preferred.

It is preferred for at least one ink absorbing layer to contain colloidal silica and/or dry process silica. The colloidal silica and/or dry process silica, if contained, improve image quality and impart gloss. Colloidal silica that can be used is not particularly limited, and ordinary anionic colloidal silica or cationic colloidal silica obtainable by, for example, reaction with a polyvalent metal compound, e.g., aluminum ions can be used. The dry process silica includes, but is not limited to, fumed silica synthesized by burning silicon tetrachloride in a hydrogen oxygen flame.

The dry process silica can be used as it is or as having its surface modified with a silane coupling agent, etc.

In the present invention, a gloss layer can be provided as an outermost layer. The means for providing a gloss layer includes, but is not limited to, a method in which ultrafine particles such as colloidal silica and/or dry process silica are incorporated, a supercalendering method, a gloss calendering method, and a casting method.

The support which can be used in the invention preferably includes, but is not limited to, paper, polymer sheets, polymer films, and fabrics. If desired, the support can be subjected to a surface treatment, such as a corona discharge treatment. The thickness of the ink absorbing layer is not particularly limited but preferably in a range of 1 to 100 $\mu$m, and the coating weight is preferably 1 to 100 g/m$^2$. Methods for applying the coating liquid are not particularly limited, and a blade coater, an air knife coater, a roll coater, a brush coater, a curtain coater, a bar coater, a gravure coater, a spray, etc. can be used.

EXAMPLES

The present invention will now be illustrated in greater detail with reference to the following Examples.

Powder X-ray diffraction patterns were obtained by measurement with RINT 2500, supplied by Rigaku Corp.

Pore size distributions and specific surface areas were measured with Autosorb-1, supplied from Quantachrome, by using nitrogen. The pore size distributions were calculated according to the BJH method. Average pore diameters were calculated from the peak value in the mesopore region of the differential pore size distribution curve obtained by the BJH method.

The average particle size by a dynamic light scattering method was measured with a laser zeta potentiometer ELS-800 supplied by Otsuka Electronics Co., Ltd.

TEM photographs were taken with a TEM H-7100 from Hitachi, Ltd.

A test on stability in an acidic region was carried out as follows.

A cation exchange resin in an H$^+$ form (Amberlite IR-120B) was dispersed in a prepared porous substance sol and thoroughly stirred to make the sol acidic. After the cation exchange resin was separated by filtration, the sol was put into a glass screw tube, sealed not to evaporate, and allowed to stand at 25° C. The sol was observed to see whether gelation occurred immediately after the acidification, after 3 hours and after one months from the acidification. Samples suffering from gelation were rated "bad", and those showing no change "good".

Transparency of an applied coating film was evaluated as follows. A coating liquid consisting of a porous substance, PVA 203 (available from Kuraray Co., Ltd.), and PVA 235 (from Kuraray) at a solid basis ratio of 100:1:30 was applied to a transparent PET film (Lumirror Q80D, from Toray Industries, Inc.) to a dry coating thickness of 20 $\mu$m. The transparency of the coating film was measured with D-300 (from Nippon Denko Co., Ltd.) and evaluated in terms of haze value taking the haze of the transparent PET as a standard.

For print performance evaluation, the coating film was printed solid with each of yellow, magenta, cyan and black inks using a commercially available inkjet printer PM-800C, supplied from Seiko Epson Corp. Ink absorptivity of the coating film was rated "good", "fairly good" or "bad", judging from blurring after printing and the degree of ink transfer to white paper pressed on the printed area immediately after the printing.

Example 1

In 100 g of water was dispersed 100 g of a cation exchange resin having been converted into an H$^+$ form (Amberlite IR-120B). A solution of 33.3 g of No. 3 water glass (SiO$_2$: 29 wt %; Na$_2$O: 9.5 wt %) in 66.7 g of water was added to the dispersion, followed by stirring well. The cation exchange resin was removed by filtration to give 200 g of an active silica aqueous solution, which was found to have an Sio$_2$ concentration of 5.0 wt %. In 1360 g of water was dissolved 5 g of Pluronic P103 from Asahi Denka, and 60 g of the active silica aqueous solution was added thereto while stirring in a 35° C. water bath. To the mixture was further added 20 ml of a 0.015 mol/l NaOH aqueous solution. The resulting mixture had a pH of 7.5, a water/P103 weight ratio of 289.1, and a P103/SiO$_2$ weight ratio of 1.67. The mixture was stirred at 35° C. for 15 minutes and then allowed to stand and to react at 80° C. for 24 hours. The nonionic surface active agent was removed from the resulting solution by means of an ultrafiltration apparatus to give a transparent porous substance sol having an SiO$_2$ concentration of about 4 wt %. The sample in the solution had an average particle size of 60 nm as measured by a dynamic light scattering method and a conversion specific surface area of 45 m$^2$/g. Table 1 shows the results of evaluations on a coating film prepared by using the resulting porous substance sol.

The sol was dried at 105° C. to give a porous substance. The X-ray diffraction pattern of the resulting sample showed no distinct peaks. The sample had an average pore diameter of 8 nm, a pore volume of 1.21 ml/g, and a BET nitrogen adsorption specific surface area of 720 m$^2$/g, giving a difference of 675 m$^2$/g from the conversion specific surface area.

Example 2

Figure 1:
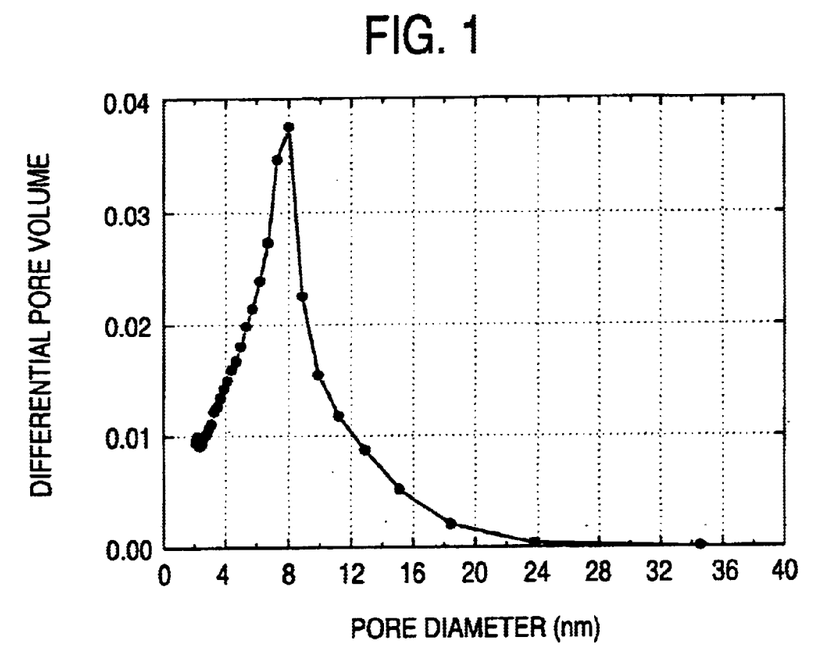
FIG. 1 is a pore size distribution diagram of the porous substance synthesized in Example 1.
Figure 2:
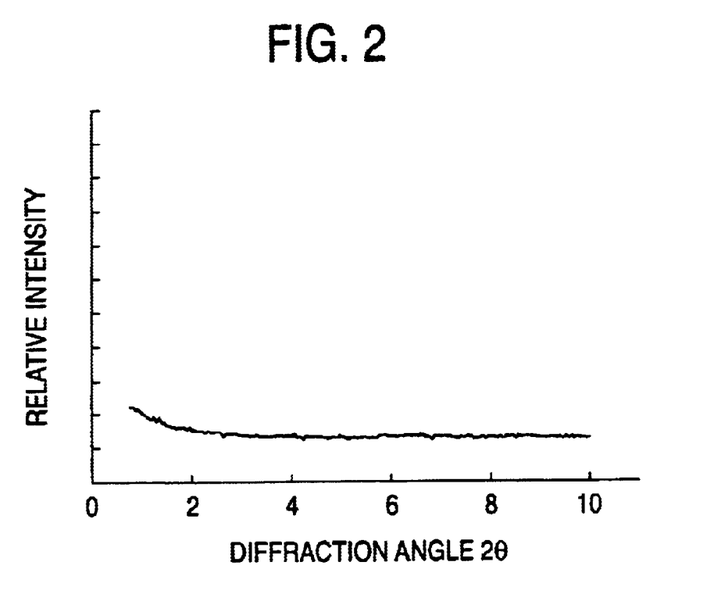
FIG. 2 is a powder X-ray diffraction pattern of the porous substance synthesized in Example 1.
Figure 3:
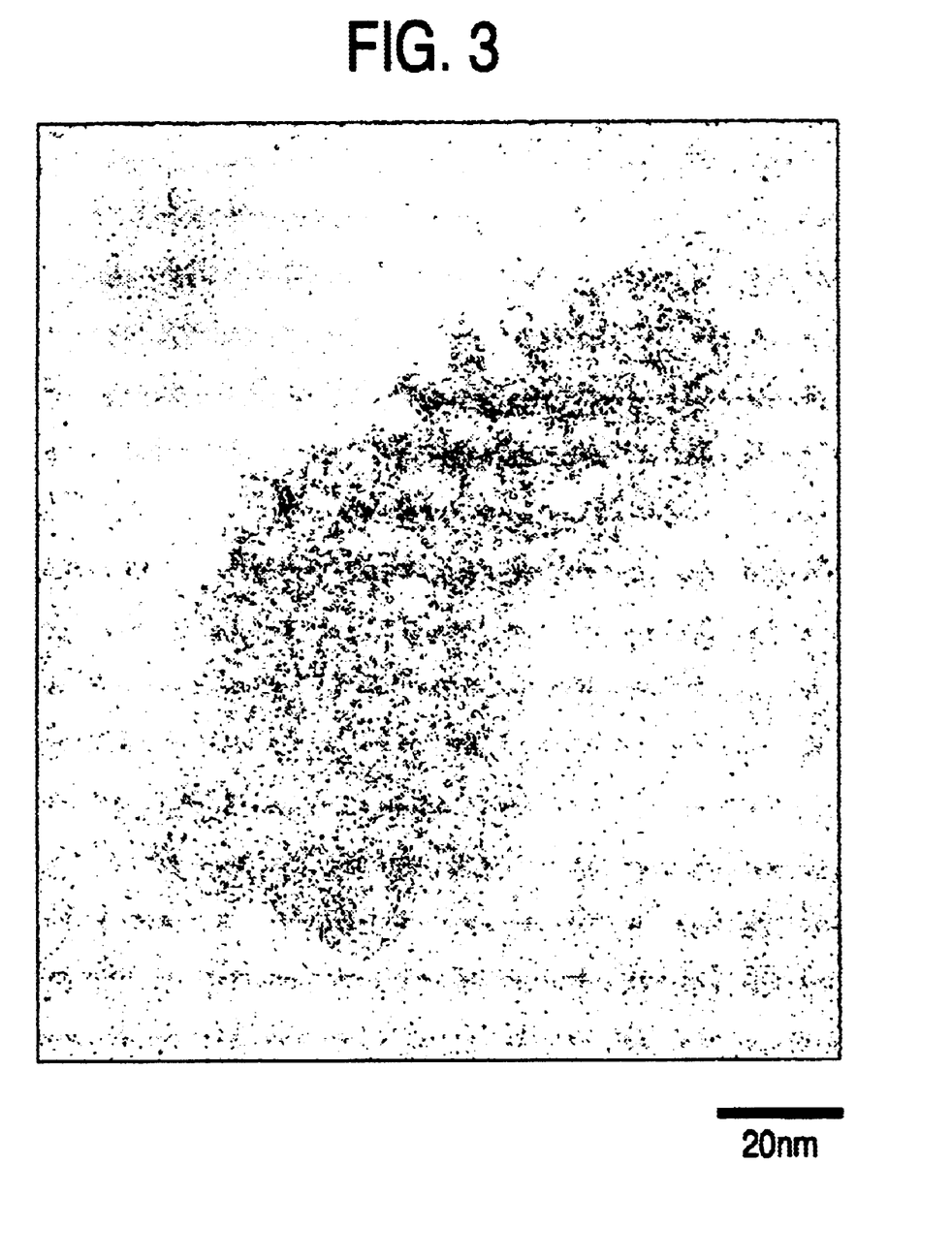
FIG. 3 is a TEM photograph of the porous substance synthesized in Example 2.
Figure 4:
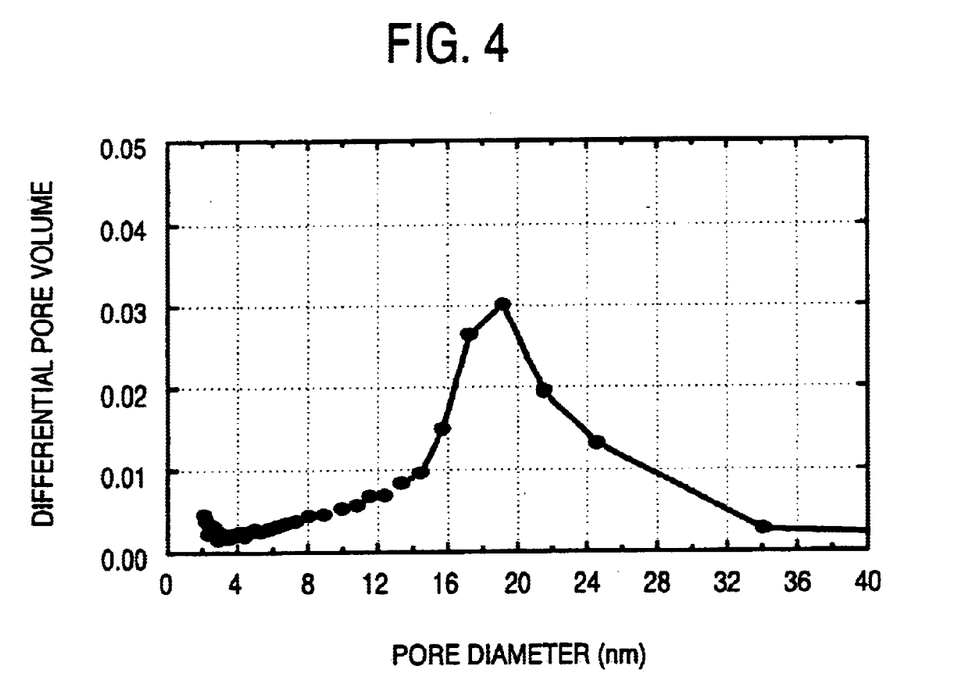
FIG. 4 is a pore size distribution diagram of the porous substance synthesized in Example 4.
Figure 5:
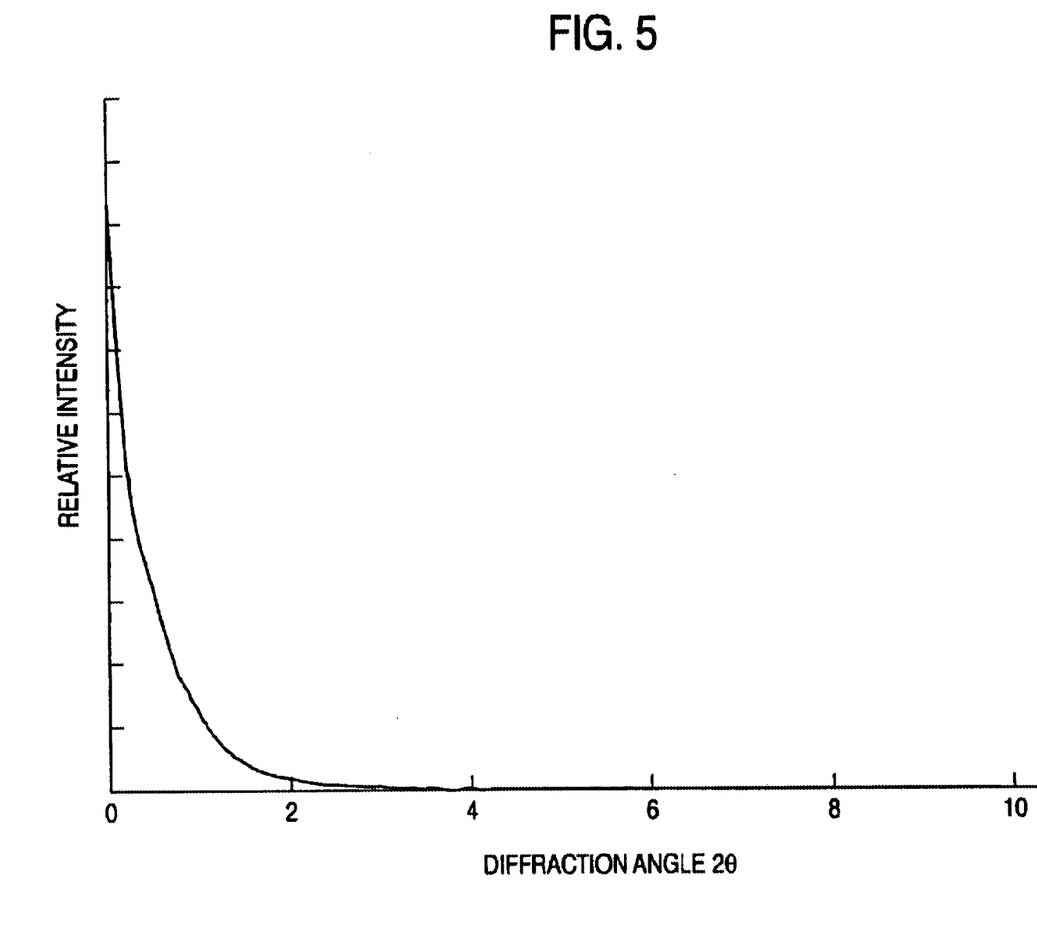
FIG. 5 is a powder X-ray diffraction pattern of the porous substance synthesized in Example 4.

Synthesis was carried out in the same manner as in Example 1, except for replacing P103 with P123 and changing the reaction temperature from 80° C. to 90° C., to obtain a transparent porous substance sol having an SiO$_2$ concentration of about 6.9 wt %. The sample in the resulting solution had an average particle size of 130 nm as measured by a dynamic light scattering method and a conversion specific surface area of 21 m$^2$/g. A specimen for TEM was prepared from the solution by means of a nebulizer and observed under a TEM (FIG. 3). Fine pores with uniform size were observed, and it can be seen that there is no long-period order. The sol was dried at 105° C. to obtain a porous substance. The X-ray diffraction pattern of the sample showed no distinct peaks. The sample had an average pore diameter of 9 nm and a pore volume of 1.81 ml/g. The BET nitrogen adsorption specific surface area was 690 m$^2$/g, showing a difference of 670 m$^2$/g from the conversion specific surface area.

The results of evaluation on a coating film prepared by using the resulting porous substance sol are shown in Table 1.

Example 3

In 600 g of water was dispersed 600 g of a cation exchange resin having been converted into an H$^+$ form (Amberlite IR-120B). A solution of 200 g of No. 3 water glass (SiO$_2$: 30 wt %; Na$_2$O: 9.5 wt %) in 400 g of water was added to the dispersion, followed by stirring well. The cation exchange resin was removed by filtration to give 1200 g of an active silica aqueous solution, which had an $SiO_2$ concentration of 5.0 wt %. The solution was diluted with 3800 g of purified water.

In 900 g of water was dissolved 100 g of Pluronic P123 from Asahi Denka, and 6000 g of the diluted active silica aqueous solution was added thereto while stirring at room temperature. The resulting mixture had a pH of 3.7, a water/P123 weight ratio of 58.4, and a P123/$SiO_2$ weight ratio of 1.67. The mixture was allowed to stand to react at 95° C. for 24 hours. The nonionic surface active agent was removed from the resulting solution by means of an ultra-filtration apparatus to give a transparent porous substance sol having an $SiO_2$ concentration of about 5.2 wt %. The sample in the solution had an average particle size of 350 nm as measured by a dynamic light scattering method and a conversion specific surface area of 8 $m^2$/g. Table 1 shows the results of evaluations on a coating film prepared by using the resulting porous substance sol.

The sol was dried at 105° C. to give a porous substance. The X-ray diffraction pattern of the resulting sample showed no distinct peaks. The sample had an average pore diameter of 9 nm, a pore volume of 2.37 ml/g, and a BET nitrogen adsorption specific surface area of 590 $m^2$/g, giving a difference of 582 $m^2$/g from the conversion specific surface area.

Example 4

In 300 g of water was dispersed 300 g of a cation exchange resin having been converted into an $H^+$ form (Amberlite IR-120B). A solution of 100 g of No. 3 water glass ($SiO_2$: 30 wt %; $Na_2O$: 9.5 wt %) in 200 g of water was added to the dispersion, followed by stirring well. The cation exchange resin was removed by filtration to give 600 g of an active silica aqueous solution, which had an $SiO_2$ concentration of 5.0 wt %. The solution was diluted with 1675 g of purified water. Separately, 500 g of an aqueous solution having dissolved therein 50 g of Pluronic P123, 200 g of a 0.015 mol/l sodium hydroxide aqueous solution, and 25 g of trimethylbenzene were mixed and stirred under heating at 60° C. for 1 hour to prepare a white transparent solution. The resulting solution was added dropwise to the diluted active silica aqueous solution, and the mixture was heated at 80° C. for 24 hours. P123 was removed from the resulting solution in an ultrafiltration apparatus to give a porous substance sol having an $SiO_2$ concentration of about 7.5 wt % (hereinafter referred to as liquid A). A 1 wt % aqueous solution of sodium aluminate was added to liquid A to result in an Al/(Si+Al) elemental ratio of 0.01. The mixture was heated at 80° C. for 24 hours to give a porous substance sol (hereinafter referred to as liquid B).

The sample in the solution had an average particle size of 195 nm as measured by a dynamic light scattering method and a conversion specific surface area of 15 $m^2$/g. The solution was dried at 105° C. to give a porous substance. The X-ray diffraction pattern of the resulting sample showed no distinct peaks. The sample had an average pore diameter of 18 nm, a pore volume of 1.67 ml/g, and a BET nitrogen adsorption specific surface area of 413 $m^2$/g, giving a difference of 398 $m^2$/g from the conversion specific surface area.

Liquid A and liquid B were subjected to the stability test. The results obtained are summarized in Table 2.

Example 5

A 10 wt % aqueous solution of sodium aluminate was added to solution A obtained in Example 4 to result in an Al/(Si+Al) elemental ratio of 0.1. The resulting mixture was heated at 80° C. for 24 hours to obtain a porous substance sol. The results of a stability test on the sol are shown in Table 2.

Example 6

To 18.4 g of liquid A prepared in Example 4 was added 1.9 g of a 1 wt % aqueous solution of sodium aluminate to result in an Al/(Si+Al) elemental ratio of 0.01. The resulting mixture was left to stand at room temperature for 24 hours to obtain a porous substance sol. The results of a stability test on the sol are shown in Table 2.

Comparative Example 1

The addition of a 0.015 mol/l NaOH aqueous solution in Example 1 was replaced with addition of 140 ml of a 0.1 mol/l HCl aqueous solution. Whereupon a white precipitate was formed. The resultant mixture had a pH of 0.96. The mixture was left to stand to react at 80° C. for 24 hours. The composite thus formed was collected by filtration, washed with water, and dried at 105° C. The composite was fired in air at 550° C. for 6 hours. The resulting sample had too large particle sizes to be measured by a dynamic light scattering method. A coating film formed of the resulting substance was white opaque, the haze of which was outside a measurable range.

Comparative Example 2

The addition of the active silica aqueous solution in Example 1 was replaced with addition of a solution of 10 g of No. 3 water glass ($SiO_2$: 30 wt %; $Na_2O$: 9.5 wt %) in 50 g of water. Further, the addition of the 0.015 mol/l NaOH aqueous solution in Example 1 was replaced with addition of 31 ml of a 0.1 mol/l HCl aqueous solution to adjust the mixture to pH 6.1, whereupon a gel precipitate was formed. The mixture was left to stand to react at 80° C. for 24 hours. The composite thus formed was collected by filtration, washed with water, and dried at 105° C. The composite was fired in air at 550° C. for 6 hours. The sample had too large particle sizes to be measured by a dynamic light scattering method. A coating film formed of the resulting substance was white opaque, the haze of which was outside a measurable range.

Comparative Example 3

In 30 g of water was dissolved 10 g of Pluronic P103 from Asahi Denka. Fifty grams of an active silica aqueous solution having an $SiO_2$ concentration of 5 wt %, which was prepared in the same manner as in Example 1, was added thereto while stirring in a 35° C. water bath. To the mixture was further added 2.5 ml of a 0.1 mol/l NaOH aqueous solution, whereupon a white precipitate was formed. The mixture had a pH of 7.0. The water/P103 weight ratio was 8, and the P103/$SiO_2$ weight ratio was 4. The mixture was left to stand to react at 80° C. for 24 hours. The resulting composite was collected by filtration, washed with water, and dried at 105° C. The composite was fired in air at 550° C. for 6 hours. The sample had too large particle sizes to be measured by a dynamic light scattering method. A coating film formed of the resulting substance was white opaque, the haze of which was outside a measurable range.

Comparative Example 4

A commercially available colloidal silica solution (Snowtex PS-M, available from Nissan Chemical Industries, Ltd.) had an average particle size of 150 nm as measured by a dynamic light scattering method and a conversion specific surface area of 18 $m^2$/g. The results of evaluations on a coating film formed of the solution are shown in Table 1.

The solution was dried at 105° C. The X-ray diffraction pattern of the sample showed no distinct peaks. The BET nitrogen adsorption specific surface area of the sample was 100 m$^2$/g, giving a difference of 82 m$^2$/g from the conversion specific surface area.

TABLE 1

|  | Transparency | Ink Absorptivity |
|---|---|---|
| Example 1 | 3 | fairly good |
| Example 2 | 5 | good |
| Example 3 | 20 | good |
| Example 4 | 1 | good |
| Comparative Example 4 | 4 | bad |

TABLE 2

|  | pH | Immediately after Acidification | After 3 hrs | After 1 month |
|---|---|---|---|---|
| Example 4 (liquid A) | 3.2 | bad (gelled) | — | — |
| Example 4 (liquid B) | 3.24 | good (stable) | good (stable) | good (stable) |
| Example 5 | 3.18 | good (stable) | good (stable) | good (stable) |
| Example 6 | 3.14 | good (stable) | bad (gelled) | — |

Industrial Applicability

Having pores and being finely particulate, the porous substance of the present invention is expected to have such effects as absorbing a substance, embracing and protecting a substance, or slowly releasing a substance and is also applicable to those fields further requiring transparency, smoothness, and the like. Being amorphous, it shows no such shape selectivity as is observed with a substance having a regular structure.

Where the porous substance of the invention contains silicon, addition of an alkali aluminate in the production thereof yields a sol which is stable enough to withstand long-term storage even when rendered acidic or having a cationic substance added thereto.

The inkjet recording medium according to the present invention gives excellent effects in ink absorptivity and transparency.

What is claimed is:

1. A porous substance comprising inorganic particles which are amorphous and have pores of a uniform diameter, wherein said particles have an average particle size $D_L$ of 10 to 400 nm as measured by a dynamic light scattering method, and wherein said porous substance has a specific surface area difference, $S_B$–$S_L$, between a conversion specific surface area $S_L$ calculated from $D_L$ and a nitrogen adsorption specific surface area of the particles $S_B$ obtained by the BET method, of 250 m$^2$/g or more.

2. The porous substance according to claim 1, wherein said pores have an average diameter of 6 nm or larger.

3. The porous substance according to claim 1 or 2, wherein said inorganic material is silicon oxide.

4. The porous substance according to claim 1 or 2, wherein said inorganic material contains silicon and aluminum.

5. A sol comprising a solvent and 0.5 to 30% by weight of a porous substance according to any one of claims 1 to 4 contained in the solvent.

6. An inkjet recording medium comprising a support and one or more ink absorbing layers provided on the support, wherein at least one of said ink absorbing layer(s) contains a porous substance according to claim 1 or 2.

7. A coating liquid for an inkjet recording medium containing a porous substance according to claim 1 or 2.

* * * * *